Dec. 4, 1956  G. H. JANSON  2,772,761
ELECTROMAGNETIC CLUTCH WITH PARTICULATE CLUTCHING MEDIUM
Filed Dec. 17, 1951

INVENTOR:
Gunnar H. Janson

BY
Leonard S. Chinfred
Attorney

United States Patent Office 2,772,761
Patented Dec. 4, 1956

2,772,761

ELECTROMAGNETIC CLUTCH WITH PARTICULATE CLUTCHING MEDIUM

Gunnar H. Janson, Grand Rapids, Mich., assignor to Lear, Incorporated, Grand Rapids, Mich.

Application December 17, 1951, Serial No. 262,027

11 Claims. (Cl. 192—21.5)

This invention relates to an electromagnetic clutch of the type wherein a magnetizable, particulate clutching medium is employed to couple the driving and driven members.

Clutches of this character have been developed only during the past few years, and all of those known to me have suffered from a common defect, namely, the effects of powder packing. Those familiar with this art will understand that the driving and driven clutch members are enclosed within a housing which contains a magnetizable, finely divided powder, e. g. iron powder. Inasmuch as the size of the iron particles utilized for this purpose ranges from zero to 80 microns, the mass of powder is almost flour-like in consistency. As a result, during de-energized periods, gravity will cause the powder to settle to the lowest part of the cavity in which the same is contained and this, coupled with the vibration often present where such clutches are employed, will cause severe compacting of the particles. Consequently since portions of the driving and driven members are surrounded by the powder, any agglomeration of the latter tends to lock the members to a degree where a substantial torque is required to free them.

For example, in the use of such clutches as part of the servo-mechanism of an automatic pilot for aircraft, the aforesaid problem of packing due to vibration is especially serious, since the clutch must be engaged and disengaged in response to the error signal at extremely short intervals. In the case of jet aircraft the response time is very much abbreviated.

In the case of automatic pilot equipment it is of paramount importance that the human pilot be able to override the automatic pilot in emergencies. It will be recognized that standard practice is to connect the cables which operate the control surfaces of the aircraft to capstans forming the output of the servo clutches while leaving such cables continuously connected to the pilot's stick and other cockpit controls. Thus, in case of emergencies, the current to the clutches may be interrupted, and the airplane controlled manually by the pilot, the capstans rotating freely as the cables move. However if the clutch is "frozen" due to powder packing the human pilot may be unable to exert sufficient force to overcome the "locked" condition, and the airplane will go out of control.

Ordinarily, in an automatic pilot servo-mechanism, the electric motor from which power is derived is permitted to rotate continuously when the pilot is switched on, and coupling and uncoupling of the motor from the controlled element, e. g. aileron, is effected by energizing or de-energizing the clutch coil pertinent to the surface in question. However the automatic pilot may be switched off and the engines of the aircraft be running, as for example, when the airplane is grounded or during take-off and landing. Thus the vibration to which the clutch is subjected will cause packing of the powder to an even greater degree since, when the clutch motor is running, there will be some tendency to decrease the rate at which packing occurs. Often the packing will become so severe that the motor is unable to provide enough torque to cause breakaway of the clutch.

In United States Patent No. 2,519,449 there is disclosed an electromagnetic clutch of the character to which this invention relates, and in which the improvement is directed to the addition of graphite, or dry lubricant having like qualities, to the iron powder. While the desirability of lubricating the particles is manifest, and as alluded to in detail in the patent, I have found that the problem of packing is not diminished by the use of dry lubricants of the kind to which the patent refers. Moreover the use of graphite and similar materials which form a non-magnetic boundary between the iron particles will reduce the efficiency of the clutch to an appreciable degree, since the reluctance of the magnetic path is substantially increased.

In commonly owned co-pending application S. N. 214,901, filed March 10, 1951, by William P. Lear et al., there is disclosed an improved particulate clutching medium comprising iron powder having a layer of nickel incorporated therewith and which particles acting as a mass possess a coefficient of friction substantially less than that of the pure iron particles but without impairment of the mass permeability of the iron alone. However such improved powder still affords difficulty from packing.

The principal object of this invention is to provide an electromagnetic clutch which depends upon a mass of pulverulent magnetizable material, e. g. iron, for bonding the driven to the driving member and which may be left quiescent for extended periods without serious compacting of the material having occurred.

Another object is to provide a clutch as aforesaid which requires only a trifling breakaway torque notwithstanding any moderate degree of compacting.

Inasmuch as the invention improvement relates to what is now a well-known article of commerce only so much of the details thereof as are regarded essential to a proper understanding of the invention will be set forth.

For example, one form of clutch comprises a housing including a magnetizable core including annular concentric outer and inner legs and arranged to be rotated by an electric motor through gearing. The housing also contains a winding for providing flux across an annular gap defined by the legs of the core. Within the gap is positioned a paramagnetic portion, i. e. annulus, of the driven member. By suitable construction of the housing the same may, with the relatively rotatable driving and driven members, define a space for receiving a mass of magnetic material. The dimensions of the parts in their relation to the magnetic gap are such that, during de-energization of the clutch, an amount of powder suitable for operation will occupy approximately two-thirds of the net volume of the space. Accordingly it will be seen that the driven clutch disc is practically entirely immersed in the powder during de-energized periods, and that even a moderate degree of compacting of the mass of powder due to vibration can be effective to stall the motor upon energization thereof. As a bonding medium the invention contemplates the use of a mixture of iron powder and a colloidal dispersion of graphite in a fluid resin. Preferably the iron powder, prior to incorporation with the dispersion, is nickel coated in accordance with the co-pending application referred to hereinbefore. However such step is not indispensable.

Figure 2:
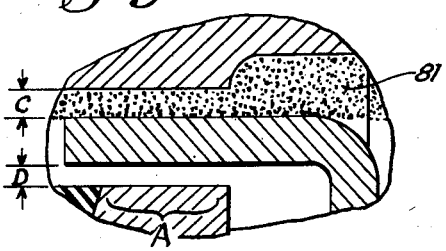
Fig. 2 is an enlarged cross-sectional detail to show the magnetic gaps.
Figure 3:
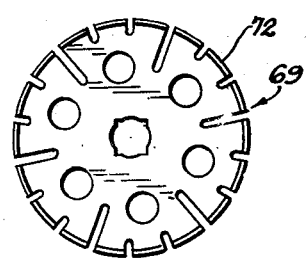
Fig. 3 is a side elevation of the driven member separated from the clutch.

The driven member comprises a shell 17 united with a substantially cylindrical part 18 and an annular part 41, all of soft iron and providing a magnetic yoke which in turn defines a magnetic gap of annular extent indicated at A (Fig. 2). The driven member 69 (Fig. 3) comprises a cup-shaped element including the magnetizable flange 72 disposed in the gap A thereby to define a pair of gaps C and D within which the magnetic bonding material 81 may become distributed upon energization of the clutch. (Fig. 2 shows the clutch in de-energized condition.)

Figure 1:
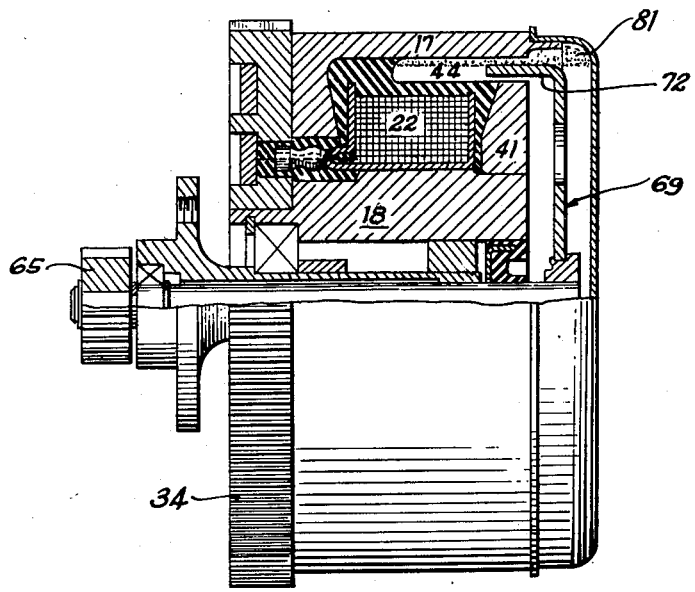
Fig. 1 shows a longitudinal cross section of a clutch in accordance with the invention.

A coil 22 is disposed in the space between the shell 17 and member 18, and, when energized, will establish magnetic flux in the gap A. Accordingly the iron powder 81 is redistributed from the "at rest" condition shown in Fig. 1 in such manner that substantially the entire quantity thereof is disposed in the gaps defined by C and D radially and by A axially, thereby to couple the driving and driven members for joint rotation.

It will be understood that the power source, e. g. an electric motor, is connected to the driving member by means of a pinion in mesh with the gear 34, and that the output of the clutch is connected by means of a pinion 65 to the driven object.

Clutches in accordance with the invention must be capable of operating in any position. Consequently it will be apparent that should the clutch be positioned with the pinion 65 down the powder will fill the annular cavity 44 and under vibration, pack itself firmly around the flange 72 of the driven member 69. In any other position of the clutch a substantially equivalent situation could arise since the amount of powder in the clutch is always sufficient to surround all or some substantial portion of the driven member thereby to lock it to adjacent parts upon compacting of the powder.

The invention comprehends the provision of a clutch which utilizes as the bonding medium an iron powder together with colloidal graphite suspended in a resin. I have found through extensive tests that graphite in conventional dry, flake form fails to provide the same result as the material of the invention, probably due to the fact that the flakes are of comparable or larger size than the iron particles they are supposed to coat, and that therefore the graphite fails to surround each particle to avoid coherence thereof. While the theory of packing of the iron powder has not been fully explored microscopically, I believe that the iron particles, not being perfect spheres, tend to interlock in the manner of a dove-tail joint and in effect to act macroscopically as a solid mass. By interposing colloidal graphite in a resinous vehicle the particles of graphite per se are not only of the same or a lower order of magnitude than the iron particles, but by virtue of the liquid vehicle employed are caused to adhere to the iron particles over their whole surface and thereby practically completely neutralizing the tendency to interlock.

A practical dispersion of colloidal graphite in a resinous vehicle may comprise 39% graphite of colloidal dimensions, 46% of a suitable solvent such as naphtha, and 15% of a medium oil length modified alkyd resin of which approximately 37% may be phthalic anhydride, these proportions being by weight. During preparation of the magnetic powder mixture in the manner hereinafter disclosed, substantially all of the solvent is driven off by heat, whereupon the resin solids become a binder for the graphite.

A preferred commercially available dispersion suitable for incorporation with the iron powder is that known as "No. 47 Colloidal Graphite Resin Dispersion," and available from Acheson Colloids Corporation of Port Huron, Michigan. As set forth in a brochure of that supplier the dispersion is as follows:

Solids content _____ 50%.
Particle size (grade)[1] _____ C.
Consistency _____ Fluid.
Vehicle _____ Resin-naphtha.[2]

[1] The fineness of the particles is designated arbitrarily by the letters A, B, C, D and E, with A representing the smallest particle size and E the coarsest.
[2] Aromatic naphtha: Flash pt. 82° F., distillation: initial ° F. 268, final ° F. 352, Kauri butanol 86.
The resin is described by the manufacturer as a "resin-modified alkyd."

Among the advantages of colloidal graphite those which are pertinent to the instant invention are as follows: lubricating ability, resistance to high temperature, anticorrosiveness, colloidal dimensions, chemical inertness, good heat conductivity and diamagnetism.

A preferred bonding material embodying the features of the invention comprises the following material:

Iron powder, e. g. A3G—A10 Plast-Iron, available from Plastics Metals Division, American Radiator Company, Johnstown, Pennsylvania, mixed with Carbonyl "E" iron, available from General Aniline Works, New York, New York, in the proportions of 80% Plast-Iron to 20% Carbonyl "E"
Nickel solution:
 No. 47 Colloidal Graphite Resin Dispersion, as referred to above.

The powder mixture is first coated with the nickel in accordance with a formula and procedure forming no part of this invention per se, since the same may be carried into practice using iron powder which has not been coated with nickel. However the nickel-coated powder is preferred, since oxidation of the powder under heating and consequent diminution of the torque output is avoided, and as disclosed in co-pending application S. N. 214,901 heretofore noted. It is preferred that the nickel be incorporated with the iron particles by a type of alloying action rather than by means of electro-plating, since in the latter case friction between the particles eventually abrades the coating, leaving the particles relatively unprotected against corrosion. However, insofar as concerns the invention, the nickel surface is not indispensible for the reason that the colloidal graphite dispersion will afford its advantages independently of any alteration in the physical character of the iron powder. A preferred mode of incorporating the nickel with the iron particles is disclosed in the commonly-owned application of William P. Lear, William F. Carr, and Fred Boshoven, Jr., Serial No. 214,901, filed March 10, 1951.

In incorporating the graphite dispersion a preferred method is as follows:

1. A quantity of No. 47 Colloidal graphite dispersion equal to 10% of the total weight of the batch of power is weighed out.
2. Assuming 1 pound of iron powder is to be prepared, the dispersion is diluted to 500 cc. with trichlorethylene, and poured over the powder.
3. The mixture is thoroughly agitated to insure complete distribution of the dispersion. In some cases it may be necessary to add more trichlorethylene to obtain proper wetting of all particles.
4. The powder and graphite dispersion are heated at 150° F. until dry, stirring occasionally to prevent caking. After drying any remaining lumps are broken.
5. The mixture is passed through a 200 mesh screen.
6. The mixture is mixed for one hour in a blender.
7. The mixture is heated to 400° F. and held there for one hour.

Figure 4:
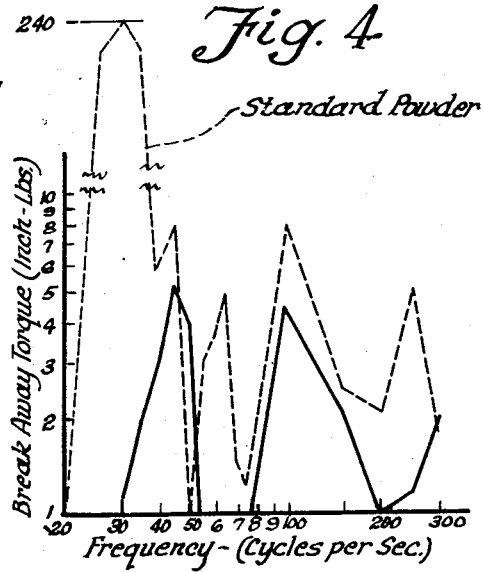
Fig. 4 is a graph comparing a clutch in accordance with prior practice against a clutch in which the invention is embodied.

Iron powder prepared in accordance with the foregoing procedure was tested in an electromagnetic clutch of the type disclosed in the application referred to hereinbefore, and with the clutch held in a fixture in a position calculated to aggravate the packing tendency of the powder to the greatest degree, namely with the shaft vertical and the gap 44 in the core of the driving member below the flange 72 of the driven disc. Thus any vibration would tend to compact the powder between the flange and the pole pieces defining the magnetic gaps C and D. Inasmuch as the tests were most conveniently conducted with the clutch assembled as part of a servo unit embodying a speed reduction of 5:1 between the output pinion 65 of the clutch and the output shaft of the servo it is to be noted that the graphs of Fig. 4 represent torque measured at the output shaft rather than at the pinion 65. However since the graphs are for comparison only the point at which the output torque is measured becomes immaterial.

During the test the clutch was subjected to vibration varying from 5 to 300 cycles per second, and the break-away and drag torque were measured. By comparison of the respective curves of Fig.4 (plotted on logarithmic scales for both axes, it will be seen that the break-away torque, i. e. the torque required to move the driven member with respect to the driving member, both being initially at a standstill and with the powder in packed condition, was substantially lower for the clutch of the invention as compared to a clutch in which nickel-coated iron powder was used. Furthermore, although not shown in graphical form, tests have proved that the drag torque is substantially less for the invention clutch. By "drag torque" is meant the torque required to continue the driven member in rotation relative to the driving member following break-away, but with the clutch de-energized.

Even though the invention is capable of being carried into practice using only "Plast-Iron" as the iron powder, I prefer to add Carbonyl "E" in the proportions heretofore pointed out. The particles of "Plast-Iron" are, on the average, somewhat larger in size than those of the Carbonyl "E" so that the latter fill the voids to provide a more homogeneous mass with concomitant higher magnetic permeability. Based on clutch current varying from 4 to 8 milliamperes, tests have demonstrated an increase in torque output of approximately 15% when utilizing the Plast-Iron-Carbonyl "E" mixture as compared to "Plast-Iron" alone.

According to a preferred specification of the "Plast-Iron" the Roller analysis is as follows:

Microns:
```
    0–10_____ 8.0% max.
   10–20_____ 15–35%.
   20–40_____ 25–45%.
   40–80_____ 15–45%.
```

Based on screen size 90% minimum should pass through a 325 mesh and 100% through a 200 mesh. In the case of the Carbonyl "E" more than 80% by weight of the material lies in the size range of from 4 to 10 microns, and more than 99% should pass through a 400 mesh screen.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. An electromagnetic clutch including a driving element adapted for connection to a source of power and a driven element, both elements being mounted for relative rotation and having opposed face portions defining a magnetic gap, means for establishing a magnetic field in said gap, and material in said field and responsive thereto for establishing a load transmitting bond between said face portions, said material comprising finely divided magnetically susceptible particles and a colloidal suspension of graphite in a vehicle comprising an alkyd resin.

2. A clutch in accordance with claim 1 in which said particles comprise finely divided iron.

3. A clutch in accordance with claim 1 in which said graphite is of colloidal dimensions and is suspended in a vehicle comprising an alkyd resin and naphtha.

4. An electromagnetic clutch including a pair of coupling members mounted for rotation relative to each other and having opposed and spaced face portions, a housing for enclosing the members, a power source for driving one of said coupling members, electrical means for establishing a magnetic field between said face portions and adapted to be energized and de-energized for engaging and disengaging the clutch respectively, and magnetically susceptible material carried in said housing and adapted to be brought into the field between said face portions upon energization of the clutch for establishing a load-transmitting bond between said members, said material comprising finely divided iron powder and graphite of colloidal dimensions suspended in a vehicle comprising an alkyd resin.

5. An electromagnetic clutch comprising a driving member and a driven member, said driving member having an annular gap and said driven member having an annular portion disposed in said gap and defining a pair of annular magnetic gaps therebetween, means for establishing magnetic flux in said gaps, a housing enclosing said driven member and at least those portions of said driving member defining said gap, and a mass of magnetically susceptible material contained in said housing and adapted, upon establishment of flux in said gaps to take up a position in said gaps for bonding said members for joint rotation, said material comprising magnetically susceptible solid particles and graphite of colloidal dimensions suspended in a vehicle which comprises an alkyd resin.

6. A device for selectively coupling a power source to a driven element comprising a driving member adapted to receive power from the source, a driven member supported for movement relative to said driving member, said driving and driven members each having a magnetizable portion and said portions being spaced apart to define a gap therebetween, means carried by at least one of said members for establishing magnetic flux in said gap, a housing defining with said members a closed space adjacent said gap, and a mass of magnetically susceptible material carried in said space and subject to said flux for taking up a position in said gap to bond said members for joint movement, said material comprising a mixture of iron powder and colloidal particles of graphite suspended in a vehicle which comprises an alkyd resin.

7. An electromagnetic clutch comprising a driving element for connection to a source of power and a driven element, both elements being mounted for relative rotation and having opposed face portions definining a magnetic gap, means for establishing a magnetic field in said gap, and particulate material in said field and responsive thereto for establishing a load-transmitting bond between said elements, said material comprising a predetermined quantity of magnetically susceptible particles having a predetermined average size and a predetermined quantity of magnetically susceptible particles having a predetermined smaller average size, the proportion of said last-named quantity to the whole being such as to substantially fill the voids between the larger particles and a quantity of solid lubricant of colloidal dimensions suspended in a vehicle which comprises an alkyd resin.

8. A clutch in accordance with claim 7 in which said particles are iron.

9. A clutch in accordance with claim 7 in which said solid lubricant is graphite.

10. A clutch in accordance with claim 7 in which at least 90% of the volume of the larger particles will pass through a screen of 325 mesh substantially 100% of the volume of the smaller particles will pass through a screen of 400 mesh, and the proportion of the smaller size particles to the whole is on the order of 1 to 5.

11. An electromagnetic clutch comprising a driving element for connection to a source of power and a driven element, both elements being mounted for relative rotation and having opposed face portions defining a magnetic gap, means for establishing a magnetic field in said gap, and particulate material in said field and responsive thereto for establishing a load-transmitting bond between said elements, said material comprising a quantity of magnetically susceptible particles of one size and a quantity of magnetically susceptible particles of smaller size, at least 90% of the volume of the larger particles passing a screen of 325 mesh and substantially 100% of the volume of the smaller particles passing a screen of 400 mesh, and the proportion of the smaller sized particles to the whole being on the order of 1 to 5.

References Cited in the file of this patent
UNITED STATES PATENTS

| 2,519,449 | Findley | Aug. 22, 1950 |
| 2,525,571 | Winther | Oct. 10, 1950 |
| 2,661,825 | Winslow | Dec. 8, 1953 |

OTHER REFERENCES

Feirtag, abstract of application 158,564, published May 1, 1951, O. G., vol 646, page 323.

Engineering Report No. 27, Servomechanisms Laboratory, Electrical Engineering Department, Massachusetts Institute of Technology, published December 13, 1950 (15 pages).